US006251512B1

(12) United States Patent
Gustafson et al.

(10) Patent No.: US 6,251,512 B1
(45) Date of Patent: *Jun. 26, 2001

(54) WRITABLE MATTE ARTICLE

(75) Inventors: Frederick John Gustafson, Bloomington; Kevin Mark Hamer, St. Paul; Ramesh Chand Kumar, Maplewood, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,924

(22) Filed: Aug. 27, 1997

(51) Int. Cl.[7] ........ B32B 5/16

(52) U.S. Cl. ........ 428/323; 428/327; 428/331; 428/328; 428/329; 428/421; 428/447; 428/448; 428/449

(58) Field of Search ........ 428/323, 327, 428/331, 328, 329, 421, 447, 448, 449

(56) References Cited

U.S. PATENT DOCUMENTS

| | | | | |
|---|---|---|---|---|
| 3,011,988 | | 12/1961 | Luedke et al. | 260/29.6 |
| 3,318,852 | | 5/1967 | Dixon | 260/78.5 |
| 4,708,907 | | 11/1987 | Flutti et al. | 428/352 |
| 4,780,411 | * | 10/1988 | Piejko et al. | 422/56 |
| 4,877,678 | | 10/1989 | Hasegawa et al. . | |
| 4,887,097 | | 12/1989 | Akiya et al. | 346/135.1 |
| 4,985,302 | | 1/1991 | Sala et al. | 428/343 |
| 5,032,460 | | 7/1991 | Kantner | 428/449 |
| 5,126,194 | | 6/1992 | Light | 428/327 |
| 5,154,962 | | 10/1992 | Mertens et al. | 428/40 |
| 5,384,179 | * | 1/1995 | Roe et al. | 428/192 |
| 5,397,626 | * | 3/1995 | Berg et al. | 428/283 |
| 5,474,843 | * | 12/1995 | Lambert et al. | 428/327 |
| 5,707,722 | * | 1/1998 | Iqbal et al. | 428/304.4 |
| 5,712,027 | * | 1/1998 | Ali et al. | 428/212 |
| 5,882,388 | * | 3/1999 | Adair et al. | 106/31.6 |

FOREIGN PATENT DOCUMENTS

| | | |
|---|---|---|
| 0 272 125 B1 | 4/1992 | (EP) . |
| 0 350 257 B1 | 10/1993 | (EP) . |
| 0 802 245 A1 | 10/1997 | (EP) . |
| 97684/79 | 8/1979 | (JP) . |
| 97528/82 | 6/1982 | (JP) . |
| 2566607 | 12/1996 | (JP) . |
| WO 96/23659 | 8/1996 | (WO) . |

* cited by examiner

*Primary Examiner*—Hoa T. Le
(74) *Attorney, Agent, or Firm*—Carolyn V. Peters

(57) ABSTRACT

A writable matte article comprising a water-absorbing layer coated on a substrate. The water absorbing layer is a unique blend of a crosslinked, water absorbing polymer particle, a water insoluble binder polymer with good adhesion to the film, and optionally, inert organic or inorganic particles that impart a matte finish to the coating. Advantageously, drying times of these inks using the present invention is reduced from about 10 minutes to 10 seconds. Preferred films are polyester and polyolefin-based films.

19 Claims, 15 Drawing Sheets

WRITABLE MATTE ARTICLE

TECHNICAL FIELD

This invention relates to writable and printable films and paper, particularly films and paper comprising a water absorbing layer coated on a polymeric film or paper and more particularly to films or paper having a water absorbing layer comprising a blend of crosslinked, water absorbing polymer particles, a water insoluble binder polymer, and optionally, inert particles.

BACKGROUND OF THE INVENTION

There are many transparency films that are writable in some fashion or another. Writability has been provided for these films by various means including surface treatment and application of materials onto the film substrate. Solvent based pen writability is typically not an insurmountable problem when it is necessary to write on a film. However, films that will work successfully with water based writing instruments typically have a number of deficiencies. Many configurations of films that are writable using both solvent and water-based instruments tend to use polyvinyl pyrollidone or polyvinyl alcohol as a water accepting agent. Varying chemistry is used to immobilize the water-accepting polymer to improve rubbing resistance and avoid tack of the coating. Immobilization is usually accomplished through crosslinking, inter-penetrating polymer networks, or ionic interactions.

Many constructions accept water based and solvent based inks, dry in a short time, and are resistant to pressure from moist fingers. Typically, these materials are transparent for use on an overhead projector. However, in general, these films are smooth and therefore do not accept pencil writing. Pencil writing is typically not a requirement of an overhead transparency.

Several examples of writable films have been described. These include for example, U.S. Pat. No. 5,126,194 wherein an ink jet transparency is described as having polyvinyl pyrollidone, a sulfonated polyester, a polyalkylene oxide, polyvinyl alcohol, nonylphenoxypolyglycidol, and inert particles coated onto a polyester film substrate. This construction performs well at room temperature, but the coating is not robust and durable under heat and humidity aging, and turns into a viscous liquid during heat and humidity aging.

Many coating formulations containing water-soluble polymers such as polyvinyl pyrollidone, sulfonated polyesters, or polyvinyl alcohol tend to exhibit similar problems with heat and humidity aging.

An alternative to examples of writable films as described above is examples of synthetic papers or tracing films. These papers tend to be roughened polymeric films. In JP 256607, polyester film was coated with a graft copolymer resin that is composed of an acrylic polymer as a principle chain, and a hydroxyl containing acrylic polymer as a branch chain. Acrylic polymers for the principle chain include polymers of acrylic acid, methacrylic acid, and their metal or ammonium salts. The film claims to have a good writing property, solvent resistance, adhesion of the coating layer, and surface roughness. Another example is JP 97,528/82 in which a polyester film was coated with a water-soluble cationic acrylic resin and benzophenone, which was subsequently UV cured for water resistance. Another example is JP 97,684/79, which describes a mixture of polyvinyl alcohol, a synthetic copolymer, and clay coated on PVDC (polyvinylidene chloride) primed polyester and used as a writable film.

For example, water-absorbing materials that are solvent insoluble have been described. U.S. Pat. No. 4,887,097 describes an ink jet recording medium, which contains particles of solvent insoluble resin that is capable of absorbing water in an amount of 50 times or more as much as its own weight. Examples of solvent insoluble resin particles include natural resins such as albumin, gelatin, casein, starch, cationic starch, gum arabic, and potassium alginate and synthetic resins such as polyvinyl alcohol, polyamide, polyacrylamide, quarternary polyvinyl pyrollidone, polyethyleneimine, polyvinylpyridinium halide, melamine resins, polyurethane, polyester, and sodium polyacrylate.

In WO 96/23659, a coating composition for a plastic film is described. The coating composition is made from an acrylic polymer or ionomer resin and an ink receptive particulate, such as a molecular sieve and/or a carbohydrate polymer such as cellulose, carboxymethyl cellulose, or cornstarch. The coating composition facilitates adhesion of ink to the polyolefin film and reduces the dry time of the ink to less than two minutes. The acrylic polymer contains carboxylic acid selected from the group consisting of acrylic acid, methacrylic acid, and mixtures thereof.

Some examples of writable adhesive coated products have been described. For example, U.S. Pat. No. 4,708,907 describes a writable adhesive tape consisting of a polyolefin substrate, having on one side an adhesive layer and on the opposite side a writable anti-adhesive layer. The writable anti-adhesive layer comprises 25% to 55% by weight of a chlorinated polyolefin, 20% to 50% by weight of a polyaldehyde resin together with 5% to 20% by weight of an anti-adhesive agent, and 25% by weight of a matting charge.

Another example (U.S. Pat. No. 4,985,302) describes a removable self-adhesive sheet with a writable surface. In this example, the sheet material is a polymer film selected from the group consisting of polyvinyl chloride, polypropylene, cellulose acetate, polyester, cellophane, high density polyethylene, or polyolefin coextrusion. The writable side of the sheet is coated with a mixture of a pigment, vinyl or acrylic resin, synthetic wax, epoxide stabilizer, phthallic acid esters, and the solvents ethyl acetate and ethanol.

SUMMARY OF THE INVENTION

Briefly, in one aspect of the present invention, a writable matte article is provided comprising a water-absorbing layer coated on a substrate. The water absorbing layer is a unique blend of a crosslinked, water absorbing polymer particle, a water insoluble binder polymer with good adhesion to the substrate, and optionally, inert organic or inorganic particles that impart a matte finish on at least one major surface of the substrate. Advantageously, drying times of these inks using the present invention is reduced from about 10 minutes to 10 seconds. Preferred substrates are polyester and polyolefin-based films. As used in this application "writable" would include not only hand writable articles, but also printable articles, such as those printed on a laser jet printer, impact printer or an ink jet printer.

Advantageously, the writable matte article of the present invention has paper-like writability with all types of pens and pencils and withstands heat and humidity aging with a minimum of problems.

This unique invention is particularly useful as a writable backing for an adhesive coated product such as a tape, label, tag or flag. An adhesive coated product may or may not have a release coating depending on the application. The invention is also useful as a substrate for ink jet and laser printing.

The invention has the following advantages:

The matte surface accepts pencil writing and produces a line darker than or equal to pencil writing on bond paper.

The article has a matte appearance, which is transparent for reading and copying print but rough enough to eliminate glare and ghosting during copying.

The article accepts ink from solvent-based pens without dewetting or wicking.

The article accepts ink from water-based pens without film splitting, de-wetting, or wicking compared to other polymeric films.

Water-based inks can be drawn into the coating and do not smear compared to uncoated polymeric films.

Furthermore, the coating used in the present invention has good wet strength and resists rub off during repeated writing in the same place with a water-based pen. Additionally, the coating has good dry strength when writing under pressure with a sharp pencil or fine point metal roller pen.

The coating of the present invention accepts ink jet, impact, and laser printing with good clarity and image adhesion.

BRIEF DESCRIPTION OF THE DRAWING

All photographs in FIGS. 1–15 were taken through a microscope at 64× magnification.

DESCRIPTION OF THE PREFERRED EMBODIMENT(S)

Figure 1:
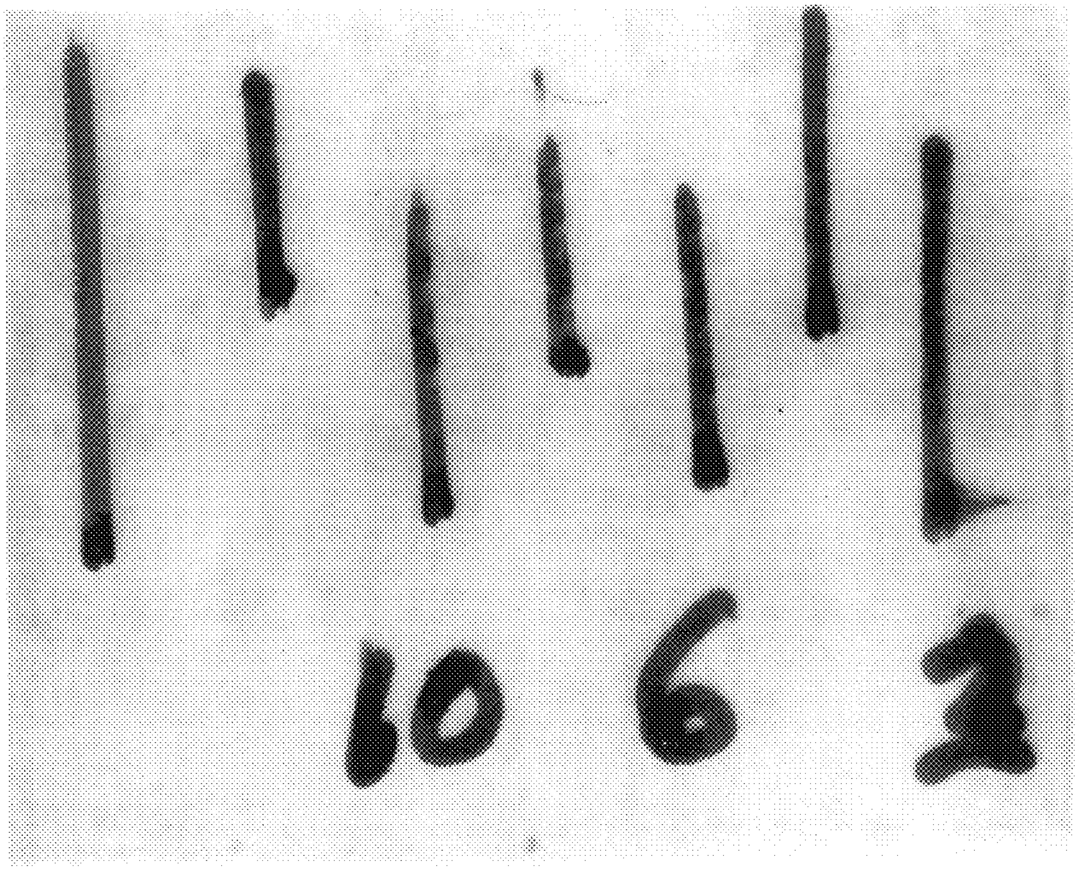
FIG. 1 is a photograph of metal roller pen smear on the film of the present invention in 2 second intervals.

The writable matte article comprises a water-absorbing layer coated on a substrate, such as polymeric film or paper. The water absorbing layer is a blend of a crosslinked, water absorbing polymer particle, a water insoluble binder polymer with good adhesion to the substrate and optionally, inert particles, such as calcium carbonate that impart a matte finish on at least one major surface of the substrate.

Polymeric films or papers include but are not limited to polyester based films, polyolefin based films, cellulose acetate film, polyvinyl chloride film, paper film laminates, and uncoated paper.

Water insoluble binder polymers comprise acrylate and acrylate/styrene copolymers composed of acrylic acid or methacrylic acid and one or more comonomers, such as ethyl acrylate, methyl methacrylate, styrene, octadecyl acrylamide, methacryloyloxyethyl trimethyl ammonium chloride, methyl acrylate, hydroxypropyl acrylate, acrylamide, amine functional acrylates or methacrylates, and N-vinyl pyrollidone. These polymers are water insoluble when dry. An acid number between 30 and 200 mg KOH per gram of resin and a glass transition temperature between 20° and 70° C. define the preferred acrylic resins.

Binder polymers include, but are not limited to, colloidal dispersion, emulsion, and solution polymers made in water or solvent. A particularly useful component of the binder is the acrylic acid or methacrylic acid, which transmits water through the binder to the crosslinked water absorbing particle. In one embodiment of the binder polymer, the acid functionality is neutralized with ammonia to a pH greater than 7.0. As an ammonia neutralized polymer at pH greater than 7.0, it is water dispersible and can therefore be coated out of water. When the coating dries, some of the ammonia evaporates leaving behind a coating that is no longer water soluble or dispersible. Suitable binder polymers include acrylic resins available from BF Goodrich under the Carboset tradename.

Crosslinked water absorbing polymer particles comprise crosslinked polyvinyl pyrollidone, polyvinyl pyridine, polyacrylic acid, polyacrylamide, polymethacrylamide, polyhydroxyl acrylates, polyamino acrylates, polyethyleneglycol acrylates and mixtures thereof. In addition, the crosslinked water absorbing particle may contain comonomers that are not water absorbing such as ethyl acrylate, methyl acrylate, methylmethacrylate, and acrylonitrile. The particles are water absorbing, although it is not necessary that all of the individual components comprising the water absorbing particles need to be water absorbing. The swelling volume of the crosslinked polymeric particle is generally between 2–20 mL of water per gram of polymer. The preferred swelling volume is 5–10 mL/gram. As used in this application "swelling volume" means a volume determined by taking a known weight of the crosslinked polymer and mixing it with an excess of water and measuring the volume occupied by the crosslinked polymer and then dividing the weight of the polymer.

These crosslinked water absorbing polymer particles impart a matte appearance to the film in addition to absorbing water during writing and printing. They may or may not provide enough roughness to the coating for good pencil writability. The crosslinked water absorbing polymer particles have a particle size in the range of 1–25 μm (mean volume particle diameter measured in water). The preferable particle size range is 5–15 μm (mean volume particle diameter measured in water). The typical ratio of crosslinked water absorbing polymer particles to water insoluble binder based on solids is 0.1 to 1.0, preferred is 0.2 to 1.0, more preferred is 0.4 to 1.0 and most preferred is 0.6 to 1.0.

The invention provides a writable matte coating on film or paper that provides a rough surface for pencil writability. The smoothness of the coated film or paper is between 30 and 200 Sheffield smoothness units, and is preferably in the range of 80–180 Sheffield smoothness units. This level of roughness can be achieved with the crosslinked water absorbing particle alone or optionally, it can be achieved by addition of inert organic or inorganic particles. Specifically, if the coating consisting of the crosslinked water absorbing particle and polymeric binder does not provide sufficient roughness, addition of other particles is preferred. Suitable inorganic particles to roughen the coating include but are not limited to calcium carbonate, silica, clay, talc, diatomaceous earth, alumina, zinc oxide, calcium sulfate, and barium sulfate. Suitable inert organic particles include but are not limited to synthetic polymers such as polymethyl methacrylate and natural product polymers in particulate form such as cellulose and starches. It is a condition of the inorganic or organic particles added for roughness that they be water insoluble.

A subclass of this invention is the writable matte article further comprising a coating of a release agent on the writable layer that is on the matte finish surface. The release agent is selected from the group consisting of (1) copolymers having at least one vinyl polymeric segment and at least one siloxane polymeric segment: (2) copolymers having an acrylic acid ester of an alkyl terminated alcohol wherein the terminal alkyl chain is from 12 to 24 carbon atoms in length; and (3) copolymers derived from ethylenically-unsaturated fluoroalkyl-containing monomers. These release agents are described in the following U.S. Pat. No. 5,032,460 (acrylate grafted silicone); U.S. Pat. No. 3,011,988 (acrylic copolymer); U.S. Pat. No. 5,154,962 (silicone grafted acrylate); and U.S. Pat. No. 3,318,852 (fluoroalkyl containing polymers).

Preferably, the release agents are those described in U.S. Pat. No. 5,032,460. The release agents are all wetted by water based and solvent based pens. The release agent has good water permeability and does not increase the drying time of water based inks on the matte article. Release agents have a dry coating thickness of 20–1000 nm, with a preferred dry coating thickness of 50–300 nm. The release agent can be coated out of solvent or water, but is preferably coated out of water. The preferred coating solution is 4–10% solids in water.

Release coating compositions are applied on writable matte article by means of conventional coating techniques such as wire-wound rod, direct gravure, offset gravure, reverse roll, air-knife and trailing blade coating. Hot melt coating can also be used. The optional release coating reduces the adhesion of adhesives to the surface so that the construction can be used as a writable backing for a tape, label, tag, flag, or other adhesive coated product in which the adhesive is in direct contact with the backing.

A wide variety of conventional pressure-sensitive adhesives such as natural rubber-based adhesives, acrylic and synthetic film-forming adhesives can be used and are well known to those in the art.

The invention is useful as a writable backing for an adhesive coated product such as a tape, label, tag or flag. An adhesive coated product may or may not have a release coating depending on the application, for example a release coating may be coated on the matte finish surface. If used, such release coatings are known to those skilled in the art and are compatible with the adhesives and polymeric substrates used in the construction of such articles.

The coated film or paper has good humidity resistance. The coating contains no water-soluble materials and does not turn into a viscous liquid at high temperature and humidity. The coated film can be aged for one week in a 38° C./90% RH atmosphere without changing its properties. The coated film can be aged against paper for one week in a 38° C./90% RH atmosphere without adhering to the paper.

Writable matte layer formulations can be coated on a primed and/or surface treated polyester film. Such priming layers and surface treatments are known to those skilled in the art and include for example, flame treating and corona-treating. For example, typical conditions for corona-treating include: corona-treating a 30 centimeters wide polyester film on one side with a power of 300–400 watts at a speed of 9–14 meters per minute.

The writable matte article of this invention is particularly useful as a writable backing for adhesive coated products such as tapes (for example, Scotch™ Magic™ tape and Scotch™ Pop-up tape), labels, tags or flags (for example, Post-it® Flags). Adhesive coated products may or may not have a release coating depending on the application and may be configured in a variety of ways, for example, a tape may be in a roll, pad, shuttling pad or the like. The invention is also useful as a substrate for ink jet, impact, and laser printing.

The objects, features, and advantages of the present invention are further illustrated by the following examples, but the particular materials and amounts thereof recited in these examples, as well as other conditions and details, should not be construed to unduly limit this invention.

EXAMPLES

This invention is further illustrated by the following examples that are not intended to limit the scope of the invention. All materials are commercially available, for example from Aldrich Chemicals and known to those skilled in the art unless otherwise stated or apparent. In the examples, all parts and percentages are by weight, unless otherwise indicated. All molecular weights reported are number average molecular weights in grams/mol. Please note in the following examples "C" before an example number indicates a comparative example, "B" indicates a binder example, and "RC" indicates a release coating example.

Examples 1 and C2–C3

Writable Film

An aqueous coating formulation was prepared in a stainless steel beaker by adding a commercially available acrylic dispersion. Next, a slurry of crosslinked polyvinyl pyrollidone was prepared by adding the dry crosslinked polyvinyl pyrollidone to a ball mill with water to make a 20% solids mixture. The ball mill was run for 1 hour and the slurry was separated from the balls using a paint filter. The resulting ground particle size had a mean volume diameter in the range of 8 micrometers as measured in water. The slurry was added to the beaker containing the acrylic dispersion. Calcium carbonate powder with a 5.5 micrometer nominal particle size was weighed and added to the beaker while the solution was being mixed by a high speed mixer. Mixing dispersed the components and broke up the agglomerates of calcium carbonate. The dry weight ratios of the acrylic dispersion, crosslinked polyvinyl pyrollidone particles, and calcium carbonate particles were 2:2:1.

This solution was handspread on 46 micrometers corona treated polyester film using a number 20 wire-wound metering rod. The coated film was dried for 5 minutes at 80° C. in a forced air oven.

The film was compared to a commercially available polyester film with a shiny side and a coated, particle filled polyester-based matte side (Matte Clear Polyester, 65 micrometers thickness, commercially available as #8049 from 3M Co.). For each of the three films, wet out and smear of various pens and pencils were measured and photographed.

Wet out scale

3—paper like writing

2—thin or spotty coverage

1—dewetting of ink

0—no ink or pencil coverage on surface

TABLE 1

Figure 2:
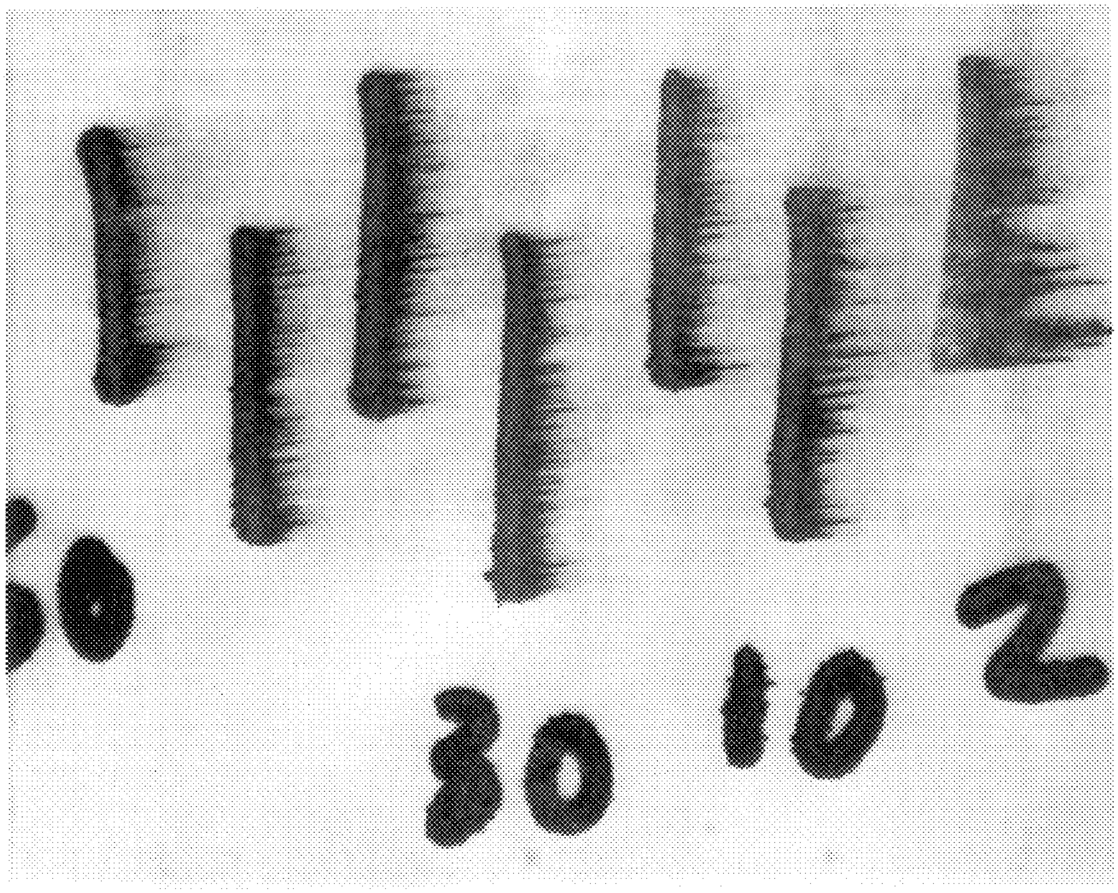
FIG. 2 is a photograph of metal roller pen smear on a conventional matte polyester film in 10 second intervals.
Figure 3:
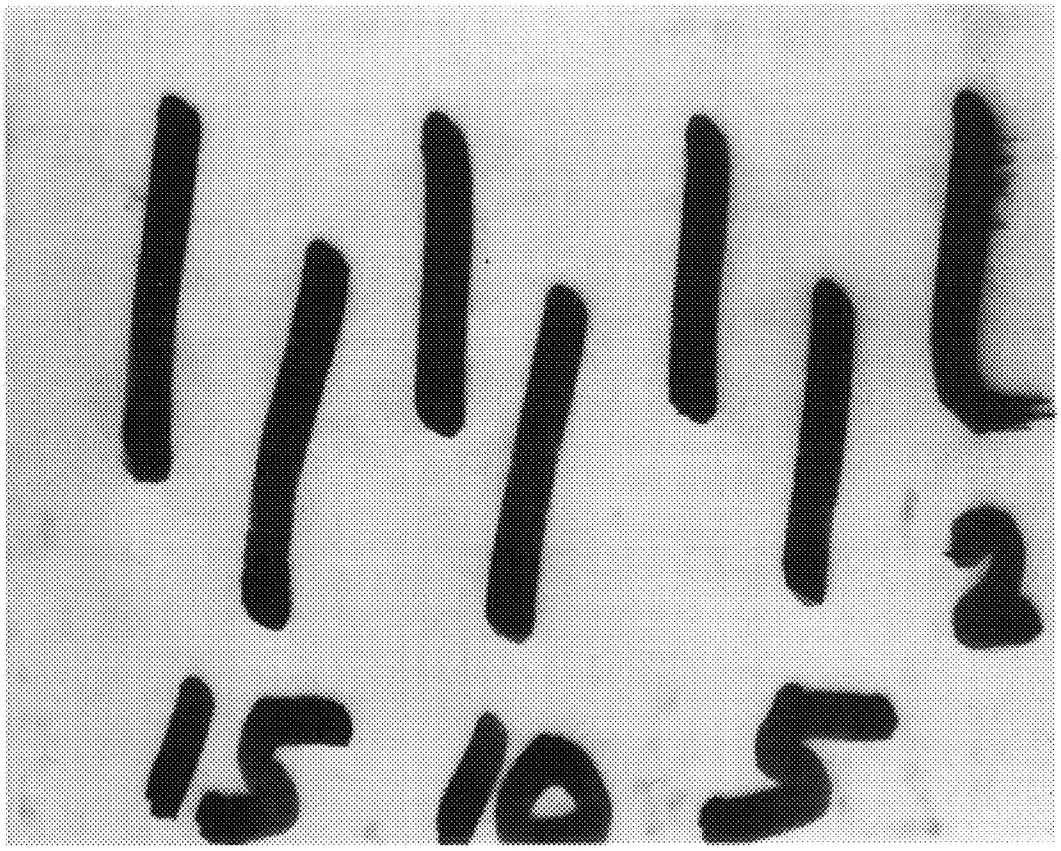
FIG. 3 is a photograph of felt tip pen smear on the film of the present invention in 2.5 second intervals.
Figure 4:
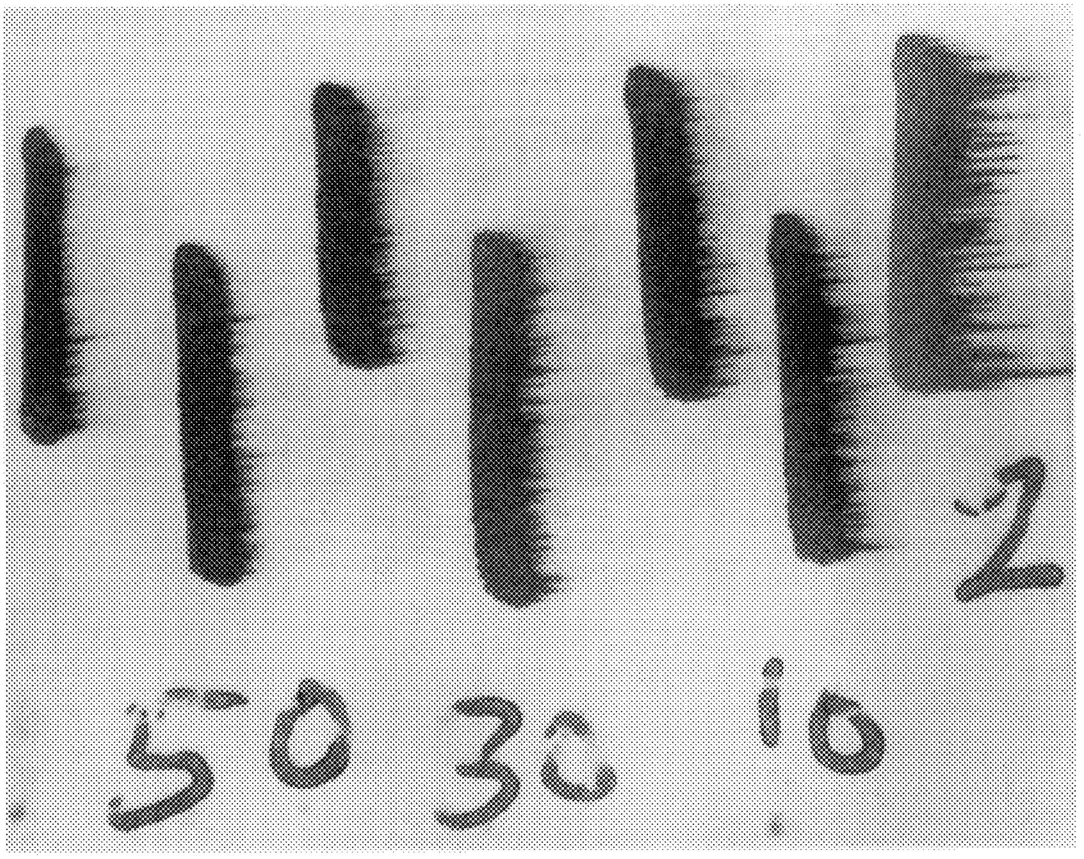
FIG. 4 is a photograph of felt tip pen smear on a conventional matte polyester film in 10 second intervals.
Figure 5:
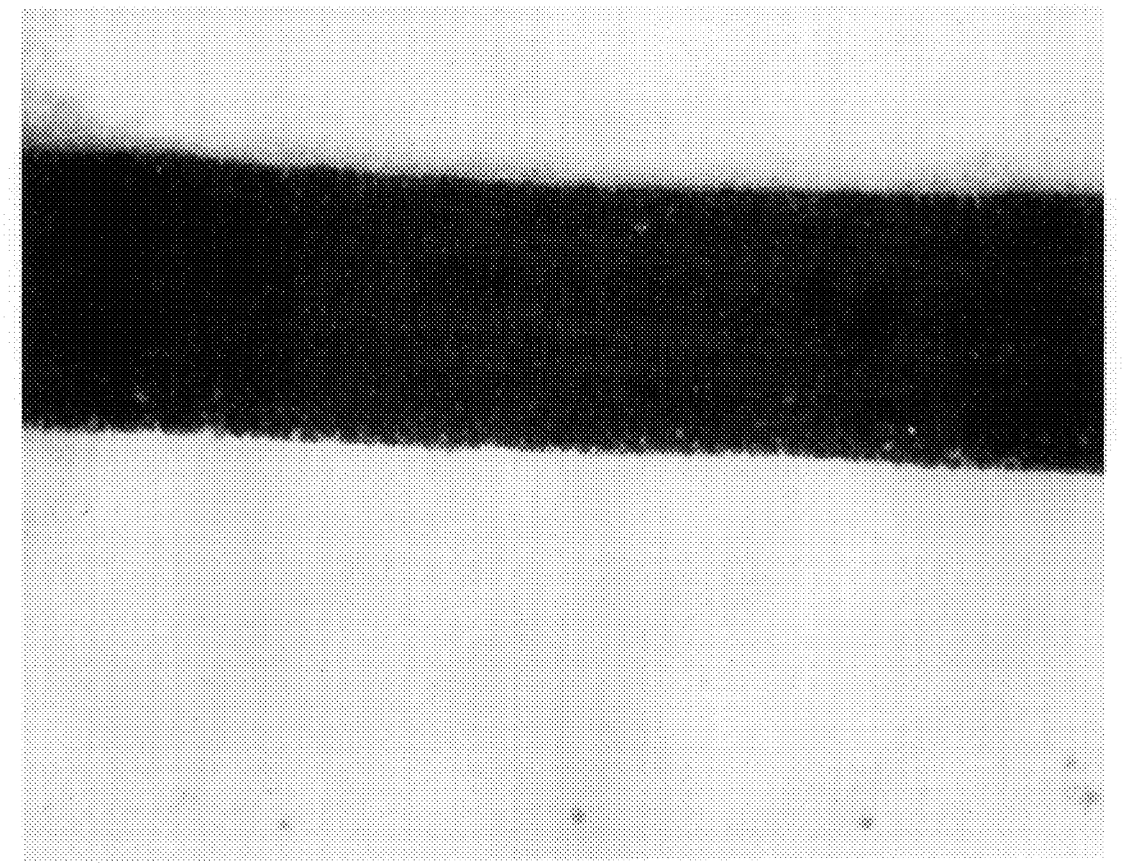
FIG. 5 is a photograph of the wet-out of a metal roller pen on the film of the present invention.
Figure 6:
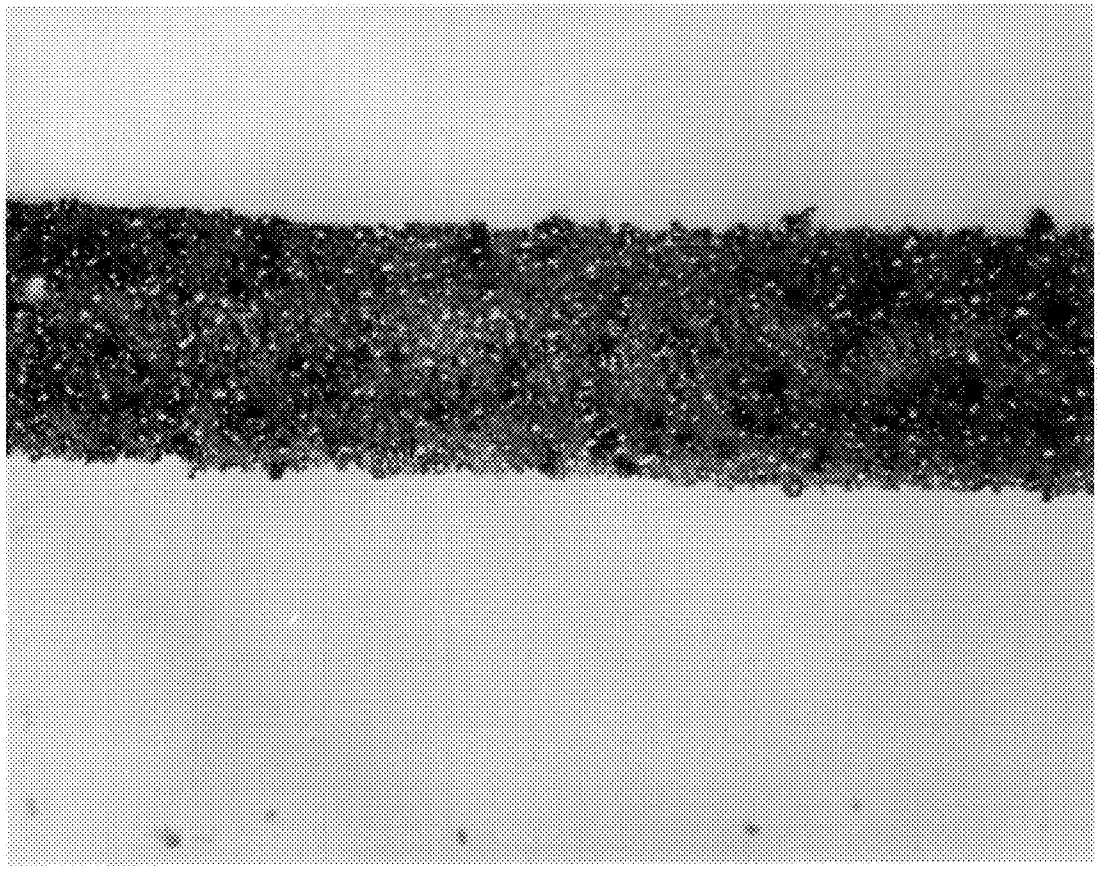
FIG. 6 is a photograph of the wet-out of a metal roller pen on a conventional matte polyester film.
Figure 7:
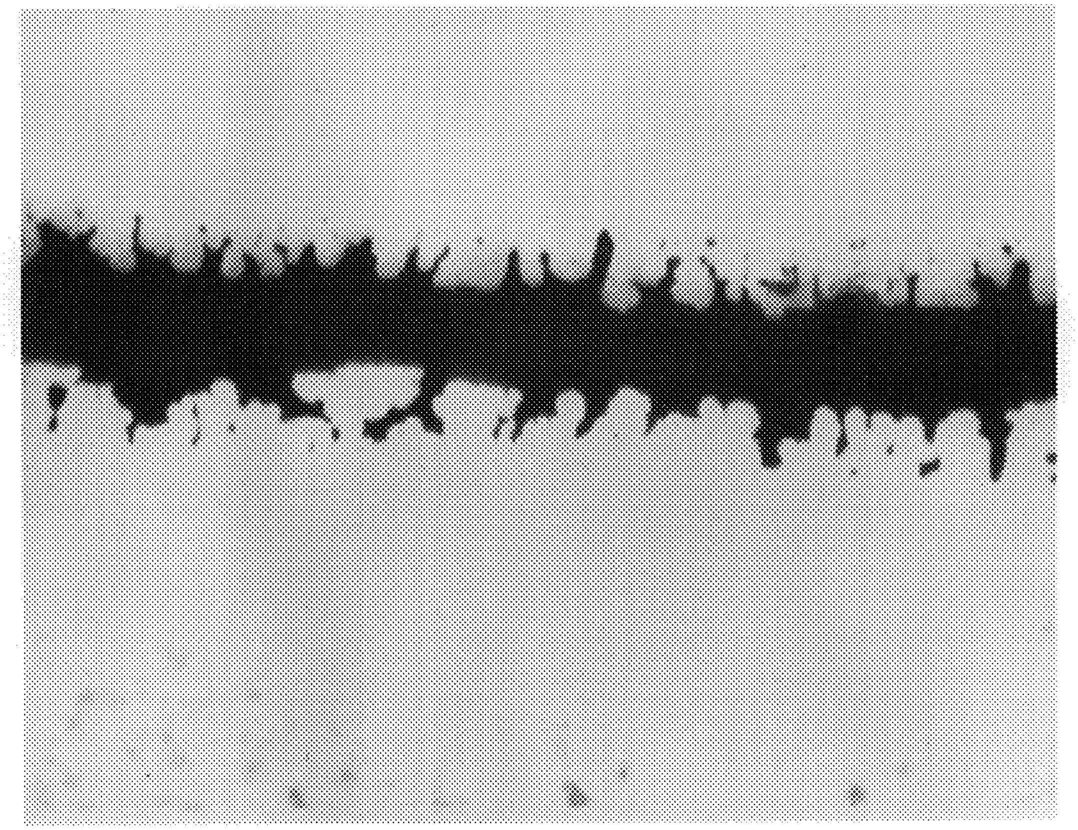
FIG. 7 is a photograph of the wet-out of a metal roller pen on a conventional smooth polyester film.
Figure 8:
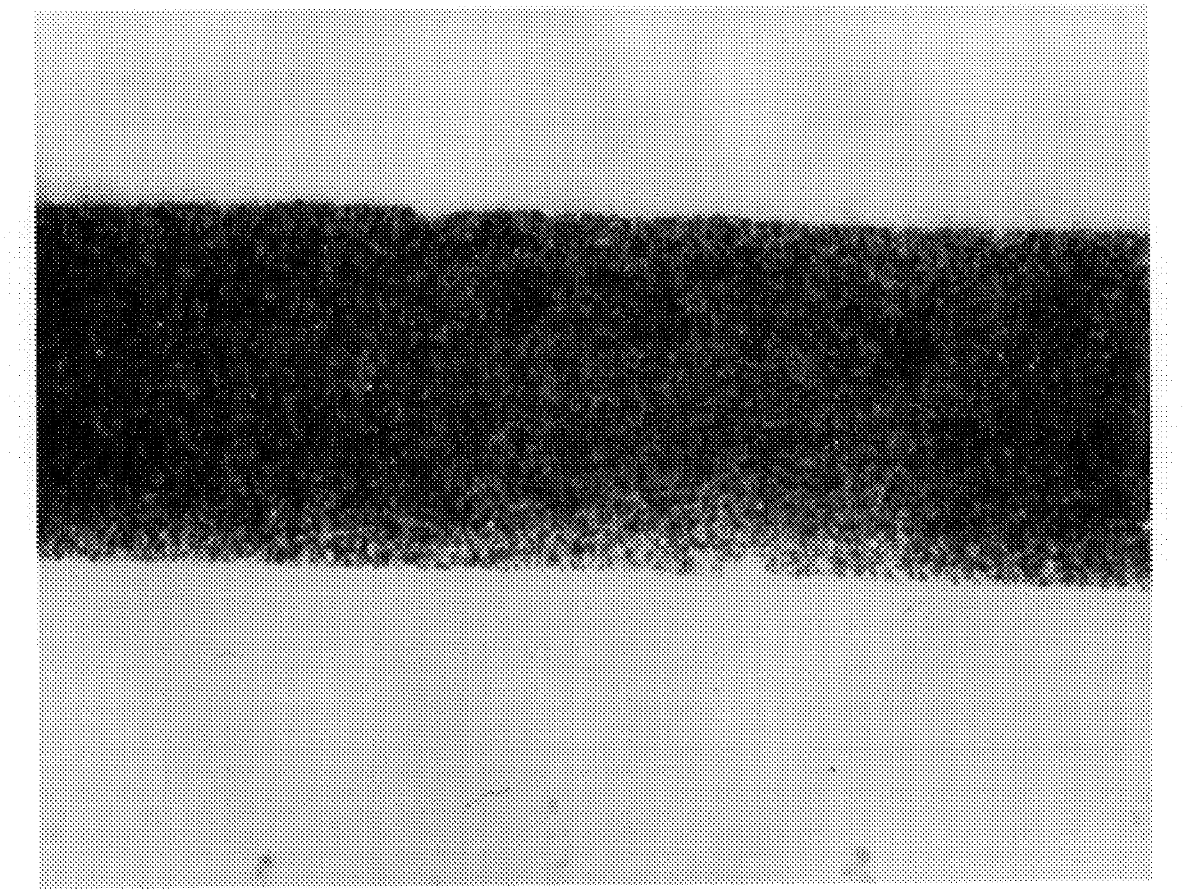
FIG. 8 is a photograph of the wet-out of a felt tip pen on the film of the present invention.
Figure 9:
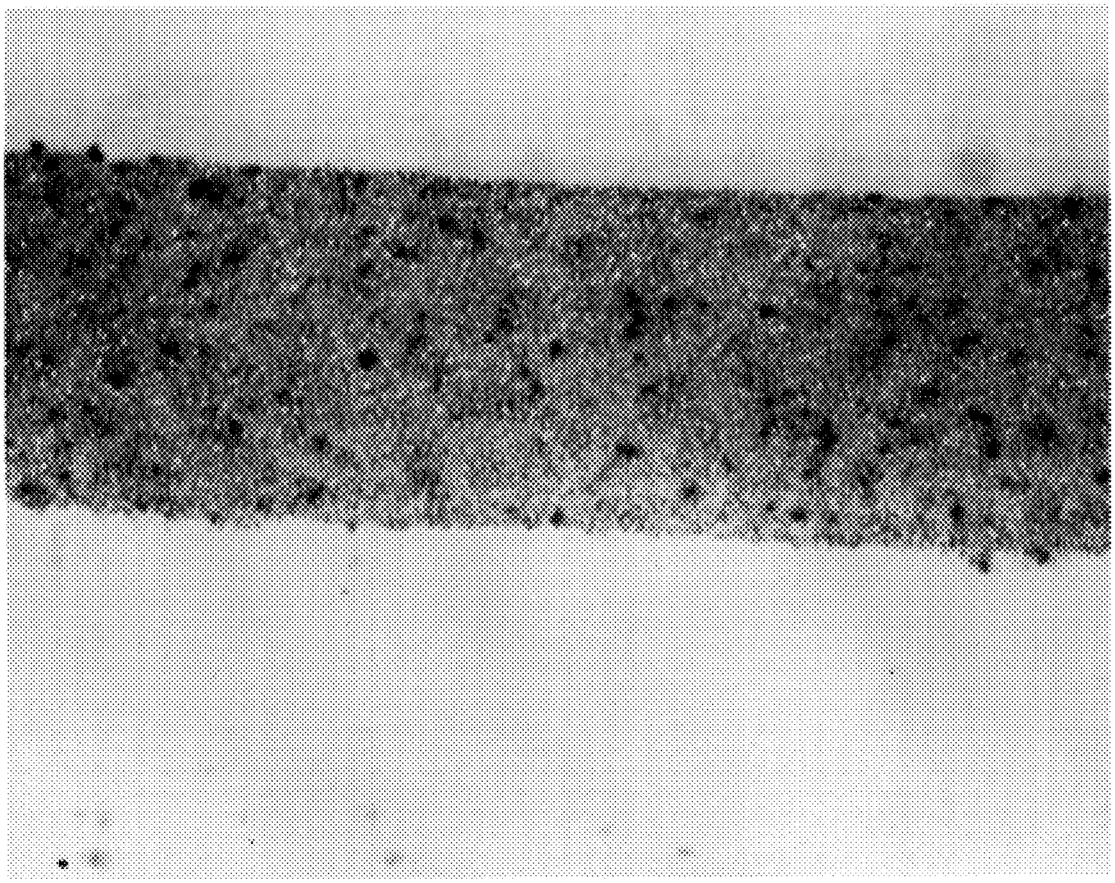
FIG. 9 is a photograph of the wet-out of a felt tip pen on a conventional matte polyester film.
Figure 10:
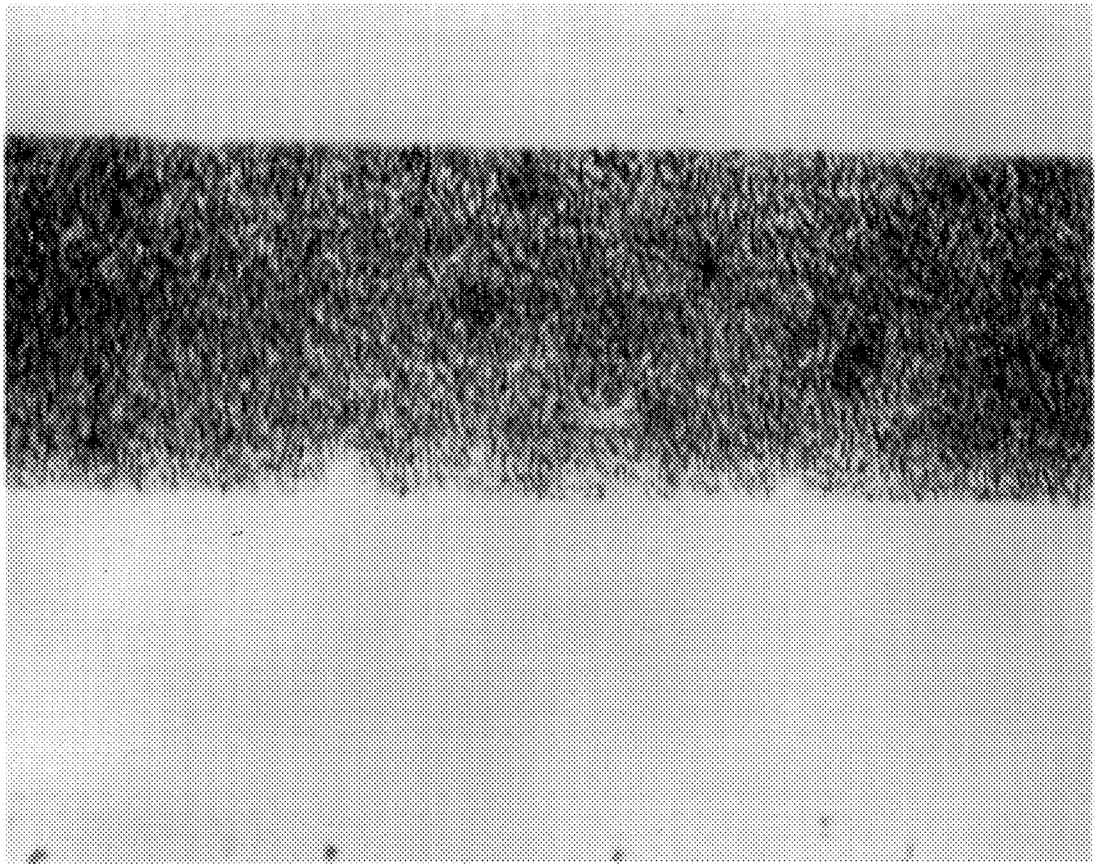
FIG. 10 is a photograph of the wet-out of a felt tip pen on a conventional smooth polyester film.
Figure 11:
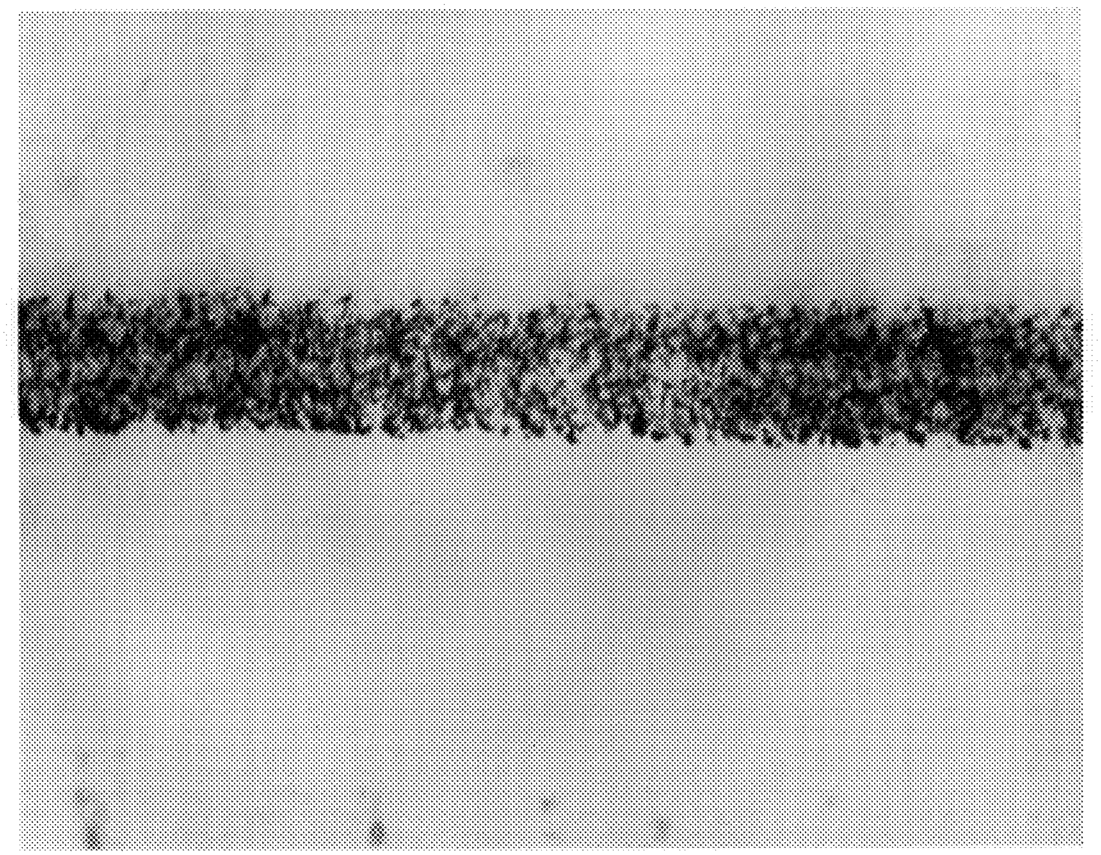
FIG. 11 is a photograph of the wet-out of a ball point pen on the film of the present invention.
Figure 12:
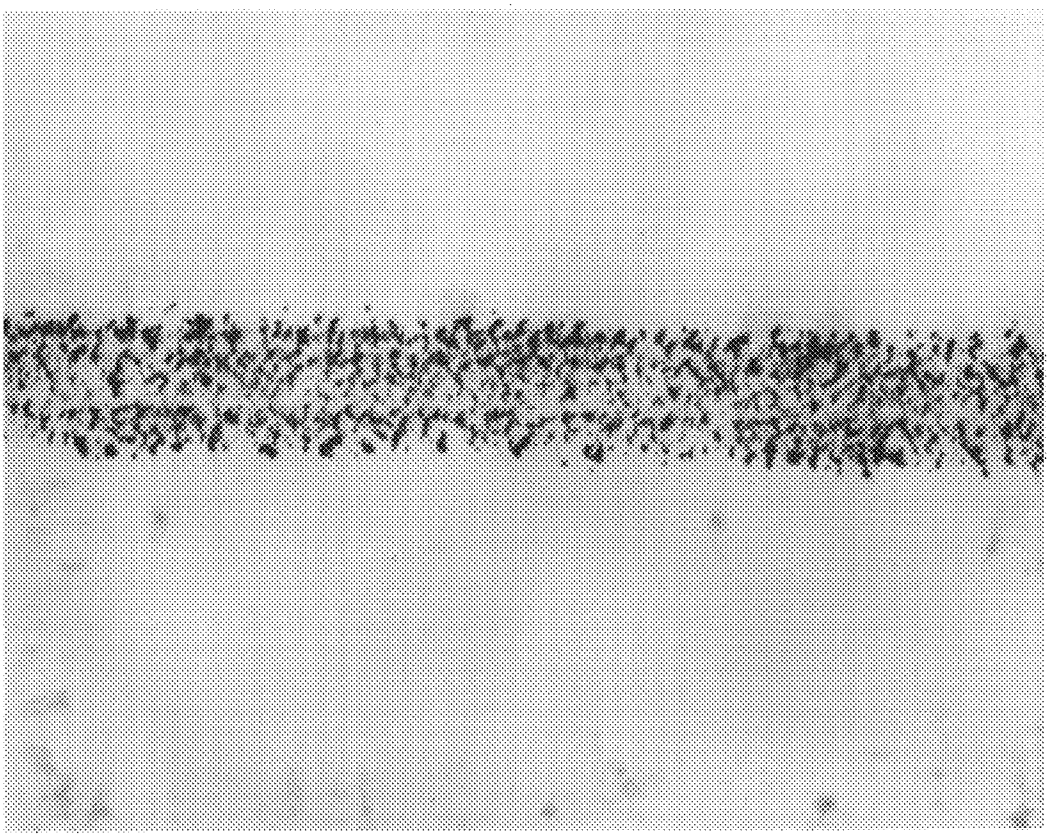
FIG. 12 is a photograph of the wet-out of a ball point pen on a conventional matte polyester film.
Figure 13:
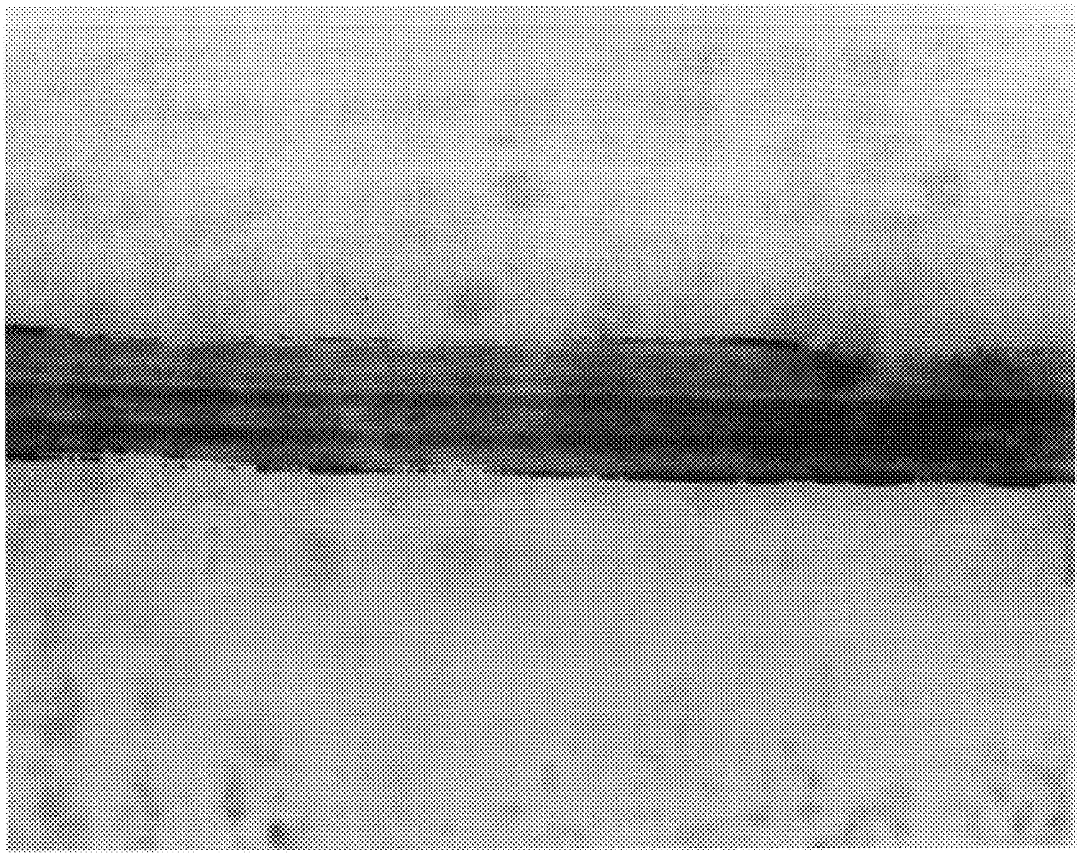
FIG. 13 is a photograph of the wet-out of a ball point pen on a conventional smooth polyester film.
Figure 14:
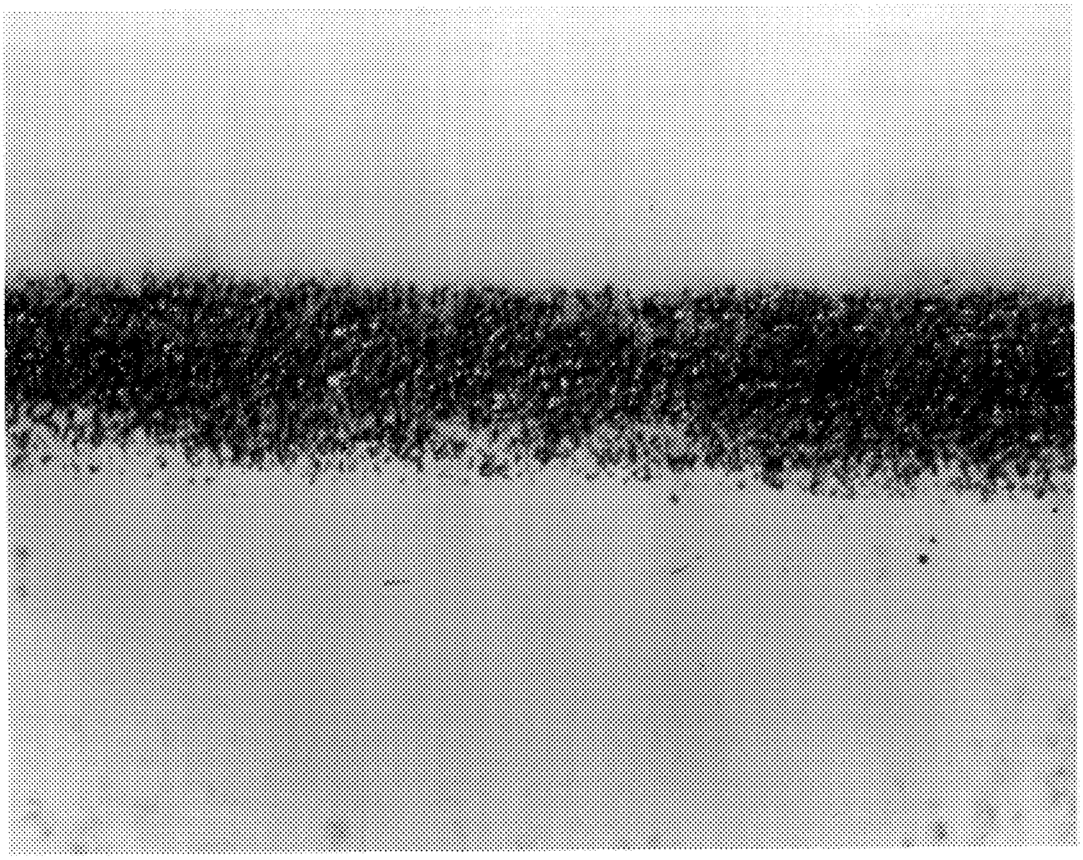
FIG. 14 is a photograph of the wet-out of a mechanical pencil on the film of the present invention.
Figure 15:
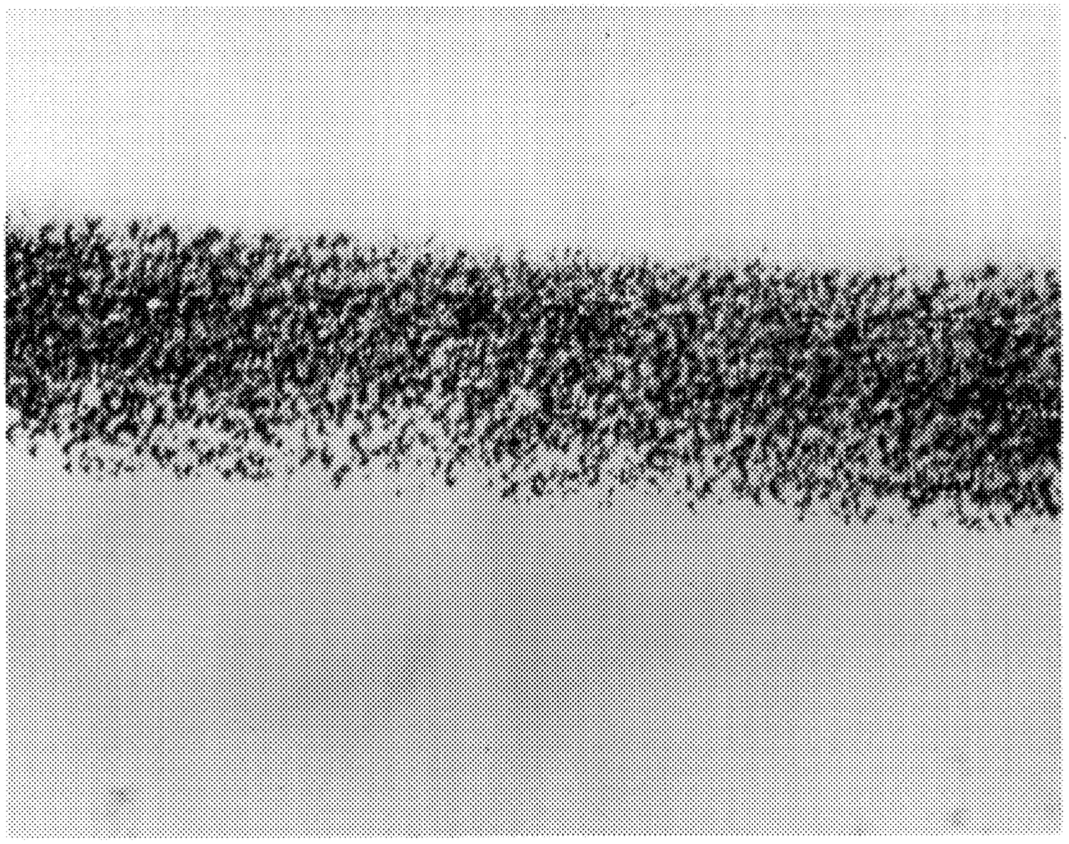
FIG. 15 is a photograph of the wet-out of a mechanical pencil on a conventional matte polyester film.

| | Film No. | | |
|---|---|---|---|
| | 1 | C2 | C3 |
| Composition | Coated matte (Example 1) | Matte PET (3M #8049) | Smooth PET (3M #8049) |
| Water Based Pen (Papermate metal roller) | Figure 1 | Figure 2 | — |
| Wet out rating | 3 (Figure 5) | 2 (Figure 6) | 1 (Figure 7) |
| Dry time of line (seconds) | 2 | 10 minutes | 10 minutes |
| Dry time of bead (seconds) | 4 | 10 minutes | 10 minutes |
| Water based Pen (Papermate felt tip) | Figure 3 | Figure 4 | |
| Wet out rating | 3 (Figure 8) | 2 (Figure 9) | 2 (Figure 10) |
| Dry time of line (seconds) | 2 | 10 minutes | 10 minutes |
| Dry time of bead (seconds) | 2 | 10 minutes | 10 minutes |
| Solvent Based Pen (BIC Classic ball point) | | | |
| Wet out rating | 2 (Figure 11) | 2 (Figure 12) | 2 (Figure 13) |
| Dry time of line (seconds) | 2 | 2 | 3 |
| Dry time of bead (seconds) | 2 | 2 | 2 |
| Mechanical pencil (Pentel 0.5 mm lead) | | | |
| Coverage rating | 3 (Figure 14) | 3 (Figure 15) | 0 |

Referring to FIGS. 1 and 2, dry times were measured by making 1 centimeter long vertical lines on the film surface every two seconds. At the end of each line, the pen was lifted from the surface creating a point of heavier ink coverage than the bulk of the line. This point, called the bead, was the slowest drying part of the line. After about 20 seconds, a 100 gram weight with cheesecloth wrapped across the bottom was dragged across the vertical lines. The weight had a 1.25 centimeter×2.5 centimeter area in contact with the film. The lowest time at which ink smear was not visible was taken to be the dry time of the ink on the surface. If the dry time was longer than 20 seconds were, vertical lines were drawn on the film surface every 5 or 10 seconds, and wiped off after 30 or 60 seconds. Dry times were not measured for pencil writing, but pencil coverage on a surface was measured. Dry time testing was stopped after 10 minutes.

As shown in Table 1 and referring to FIGS. 3–15, the coated matte film of Example 1 had excellent wet out with pens and pencils. Dry times of water based inks were less than five seconds. The matte and smooth polyester films (Film No. C2 and C3) had dry times greater of 10 minutes or greater and poor wet out of water based pens. The smooth polyester film (Film No. C3) did not accept pencil writing.

Examples 4–6 and C7–C8

Aqueous coating formulations were prepared with the acrylic dispersion of Example 1 alone and with the following added particles: calcium carbonate, crosslinked polyvinyl pyrollidone, molecular sieve 13X, and molecular sieve 5A. Table 2 presents the compositions of the coating formulations.

The formulations were handspread on 46 micrometers thick corona treated polyester film using a number 20 wire-wound metering rod. The coated film was dried for 5 minutes at 80° C. in a forced air oven. Dry coat thickness was 13 micrometers in each case.

TABLE 2

| | Film No. | | | | |
|---|---|---|---|---|---|
| Additive, phr | 4 | 5 | 6 | C7 | C8 |
| Calcium carbonate (5.5 μm) | — | 50 | 50 | — | — |
| x-PVP (ball milled) | — | — | 100 | — | — |
| Molecular sieve 13X (5 μm) | — | — | — | 100 | — |
| Molecular sieve-5A (5 μm) | — | — | — | — | 100 |

TABLE 3

| | Film No. | | | | |
|---|---|---|---|---|---|
| | 4 | 5 | 6 | C7 | C8 |
| Metal Roller | | | | | |
| Line dry time (sec) | 10 mins | 10 mins | 2 | 3 | 2 |
| Bead dry time (sec) | 10 mins | 10 mins | 4 | 9 | 3 |
| Wet strength | 8 | 8 | 5 | 8 | 8 |
| Abrasion | No | No | No | No | No |
| Felt Tip | | | | | |
| Line dry time (sec) | 10 mins | 10 mins | 2 | 7 | 6 |
| Bead dry time (sec) | 10 mins | 10 mins | 3 | 11 | 6 |
| Wet strength | 8 | 8 | 5 | 8 | 8 |
| Pencil abrasion | No | No | No | No | No |

Table 3 shows the testing results of films 4–6 and C7–C8. Wet strength was measured by writing repeatedly over the same 5 mm×5 mm area of the film with a water based pen until the coating is rubbed off. The number of passes of the pen to produce failure is reported. If eight passes did cause the coating to fail, then number eight was reported. Abrasion was measured by placing the film on a hard surface and writing as hard as possible with a fine point metal roller pen and mechanical pencil. No abrasion means the coating adhesion and cohesion was good enough to withstand severe writing pressure.

The data in Table 3 show a reduction in dry times when crosslinked polyvinyl pyrollidone and molecular sieves were particles added to the acrylic dispersion. Crosslinked polyvinyl pyrollidone and molecular sieves are water absorbing particles. Addition of calcium carbonate alone did not reduce the dry times (Film No. 5). Addition of calcium carbonate and crosslinked polyvinyl pyrollidone reduced dry times even to their lowest values (Film No. 6). The film was translucent and smooth to the touch. When placed on a piece of paper, the writing on the paper could be easily read.

Addition of molecular sieves (C7 and C8) also reduced dry times. These films were rougher and more opaque than the other films in the series because molecular sieves were opaque and N-vinyl pyrrolidone was translucent.

Examples 9–12

In these examples, the following polymeric particles were added to the commercially available acrylic dispersion used in Example 1. Crosslinked polyvinyl pyrollidone, crosslinked polyvinyl pyridine, and crosslinked polyacrylic acid are commercially available and were processed as described below. Crosslinked poly (SMA-HDDA-MA) was prepared as described in U.S. Pat. No. 5,238,756, wherein SMA is styrene maleic anhydride, HDDA is hexanediol diacrylate, and MA is methyl acrylate. Formulations were coated on polyester film as in Example 1.

The crosslinked polyvinyl pyrollidone was milled in a ball mill and the crosslinked polyvinyl pyridine was ground in a mortar. Crosslinked polyacrylic acid was neutralized with ammonium hydroxide to pH 7.1. All particles had a mean volume diameter of 10 micrometers or less.

The coating formulations containing the acrylic dispersion and the crosslinked water absorbing polymer were mixed without calcium carbonate and handspread on corona treated 46 micrometers thick polyester film using a number 20 wire-wound metering rod. Handspreads were dried in a forced air oven for 5 minutes at 80° C.

TABLE 4

| | Film No. | | | |
|---|---|---|---|---|
| Additive, phr | 9 | 10 | 11 | 12 |
| x-polyvinyl pyrollidone | 100 | — | — | — |
| x-polyvinyl pyridine | — | 100 | — | — |
| x-poly acrylic acid | — | — | 100 | — |
| x-poly (SMA-HDDA-MA) | — | — | — | 100 |

TABLE 5

| | Film No. | | | |
|---|---|---|---|---|
| | 9 | 10 | 11 | 12 |
| Metal Roller | | | | |
| Line dry time (sec) | 3 | 2 | 4 | 3 |
| Bead dry time (sec) | 8 | 2 | 11 | 5 |
| Wet strength | 5 | 8 | 5 | 8 |
| Abrasion | No | No | Yes | No |
| Felt Tip | | | | |
| Line dry time (sec) | 4 | 2 | 5 | 5 |
| Bead dry time (sec) | 7 | 2 | 60 | 14 |
| Wet strength | 5 | 8 | 5 | 8 |
| Pencil abrasion | No | No | Yes | No |

Referring to Table 5, all of the films had low dry times due to the absorbency of the crosslinked polymer. The only exception was the dry time of the felt tip pen on Film No. 11 with crosslinked polyacrylic acid as the water absorbing particle. As shown by Film No. 6, dry times are further reduced by addition of calcium carbonate. The calcium carbonate is not a water absorbing particle, but it imparts roughness to the film and protects some of the wet ink from being smeared.

Binder Preparation

Example B13

OAM/AA—90/10

(Solvent-borne Charge) A 1 liter flask equipped with a stirrer, $N_2$ inlet and a condenser were charged with 234 grams octadecyl acrylamide (OAM), 26 grams acrylic acid (AA), 390 grams methyl ethyl ketone (MEK) and a premix of 0.78 grams 2,2'-azobisisobutronitrile (VAZO-64) in 20 grams MEK. The resulting homogeneous mixture was purged with $N_2$ for 5 minutes at 1 LPM. After that the mixture was heated at 55° C. for 1 hour and then at 65° C. for an additional 23 hours. The final solids of the mixture were measured to be 41.4% in MEK (solvent-borne material)

(Water-borne Charge) The above solution was inverted into water-borne material by charging 1 liter flask with 554 grams deionized water (DI $H_2O$), 5.2 grams ammonium hydroxide and 150 grams of the solvent-borne material prepared above. The resulting inhomogeneous dispersion was put on a shaker for 10 minutes to obtain homogeneous dispersion that was subjected to a vacuum strip at 45° C. to remove the MEK. A milky water-borne solution at 10.0% solids was obtained.

Example B14

EA/MMA/AA—40/50/10

The binder of this example was prepared according to the procedure described in Example B13, with the following alterations: solvent-borne charge were 104 grams of ethyl acrylate (EA), 130 grams of methyl methacrylate (MMA), 26 grams of AA, 390 grams of MEK and a premix of 0.78 grams VAZO 64 in 20 grams MEK. The final solids of the solvent-borne material were 40%.

Water-borne charges were: 554 grams of DI $H_2O$, 5.2 grams of ammonium hydroxide and 150 grams of solvent-borne material. The final solids of the water-borne material were 10.2%.

Example B15

EA/MMA/AA/QMA—39/50/10/1

The binder of this example was prepared according to the procedure described in Example B13, with the following alterations: solvent-borne charge were 101.4 grams of ethyl acrylate (EA), 130 grams of methyl methacrylate (MMA), 26 grams of AA, 2.6 grams of methacryloloxyethyl trimethyl ammonium chloride (QMA), 390 grams of MEK and a premix of 0.78 grams VAZO 64 in 20 grams MEK. The final solids of the solvent-borne material were 41.9%.

Water-borne charges were: 540 grams of DI $H_2O$, 5.1 grams of ammonium hydroxide and 150 grams of solvent-borne material. The final solids of the water-borne material were 10.7%.

Example B16

EA/MMA/HPA/AA—40/50/10/5

The binder of this example was prepared according to the procedure described in Example B13, with the following alterations: solvent-borne charge were 99 grams of ethyl acrylate (EA), 123.8 grams of methyl methacrylate (MMA), 24.7 grams 2-hydroxy propyl acrylate (HPA), 12.4 grams of AA, 390 grams of MEK and a premix of 0.78 grams VAZO 64 in 20 grams MEK. The final solids of the solvent-borne material were 39.6%.

Water-borne charges were: 535 grams of DI $H_2O$, 2.4 grams of ammonium hydroxide and 150 grams of solvent-borne material. The final solids of the water-borne material were 10.0%.

Example B17

EA/OAM/AA—40/50/10

The binder of this example was prepared according to the procedure described in Example B13, with the following alterations: solvent-borne charge were 104 grams of EA, 130 grams of OAM, 26 grams of AA, 390 grams of MEK and a premix of 0.78 grams VAZO 64 in 20 grams MEK. The final solids of the solvent-borne material were 40.5%.

Water-borne charges were: 540 grams of DI $H_2O$, 5.1 grams of ammonium hydroxide and 150 grams of solvent-borne material. The final solids of the water-borne material were 10.4%.

Example B18

MA/NVP/AA—45/35/15

The binder of this example was prepared according to the procedure described in Example B13, with the following alterations: solvent-borne charge were 74.1 grams of methyl acrylate (MA), 57.6 grams of N-vinyl pyrollidone (NVP), 8.6 grams of AA, 336 grams of DI $H_2O$, 224 grams isopropanol (IPA) and 0.2 grams VAZO-64. The final solids of the solvent-borne material were 19.8%.

Water-borne charges were: 390 grams of DI $H_2O$, 3 grams of ammonium hydroxide and 300 grams of solvent-borne material. The final solids of the water-borne material were 10.0%.

Examples 19–24

Aqueous coating formulations were prepared according to the procedure in Example 1. In place of the acrylic dispersion in example 1, six other acrylic binders were prepared and evaluated. All coating formulations contained milled crosslinked polyvinyl pyrollidone in equal weight to the binder. Calcium carbonate was not added to any of the coating formulations detailed in Table 6. The binders contain acrylic acid and other monomers. Following the addition of an equal weight of milled crosslinked polyvinyl pyrollidone, the coating formulations were coated on corona treated polyester film using a number 20 wire-wound metering rod. The handspreads were dried in a forced air oven for 5 minutes at 80° C.

TABLE 6

| Binder | Momomer ratios | Film No. 19 | 20 | 21 | 22 | 23 | 24 |
|---|---|---|---|---|---|---|---|
| OAM/AA | 90/10 | 100 | | | | | |
| EA/MMA/AA | 40/50/10 | — | 100 | | | | |
| EA/MMA/AA/QMA | 39/50/10/1 | | | 100 | | | |
| EA/MMA/HPA/AA | 40/50/10/5 | | | | 100 | | |
| EA/OAM/AA | 40/50/10 | | | | | 100 | |
| MA/NVP/AA | 45/35/5 | | | | | | 100 |

TABLE 7

| | Film No. 19 | 20 | 21 | 22 | 23 | 24 |
|---|---|---|---|---|---|---|
| Metal Roller | | | | | | |
| Line dry time (sec) | 2 | 2 | 2 | 3 | 3 | 2 |
| Bead dry time (sec) | 4 | 3 | 4 | 8 | 7 | 30 |
| Wet strength (passes) | 2 | 5 | 5 | 8 | 7 | 4 |
| Abrasion | Yes | No | No | No | No | No |
| Felt Tip | | | | | | |
| Line dry time (sec) | 2 | 2 | 2 | 2 | 2 | 2 |
| Bead dry time (sec) | 2 | 2 | 3 | 5 | 4 | 4 |
| Wet strength (passes) | 4 | 5 | 4 | 8 | 8 | 2 |
| Pencil abrasion | No | No | No | Yes | Yes | Yes |

Referring to Table 7, all of the binders had reasonable performance in dry times, wet strength, and abrasion. The key component of the binder is the acrylic acid, which transmits water through the binder to the water absorbing polymer particle.

Examples 25–29

A series of other papers and films were coated with the acrylic dispersion in Example 1 and an equal weight of crosslinked polyvinyl pyrollidone ground for 1 hour in a ball mill. The coating formulation did not contain calcium carbonate. Formulations were handspread on corona treated 1.8 mil thick polyester film using a number 20 wire-wound metering rod. Handspreads were dried in a forced air oven for 5 minutes at 80° C.

TABLE 8

| | Film No. 25 | 26 | 27 | 28 | 29 |
|---|---|---|---|---|---|
| Material | Polyester film | Poly-propy-lene film | Cellulose acetate film | Paper-film-paper laminate | Bond paper |
| Surface Treatment | Corona | Corona | Corona | None | None |
| Metal Roller | | | | | |
| Line dry time (sec) | 3 | 4 | 8 | 2 | 2 |
| Bead dry time (sec) | 8 | 10 | 13 | 10 | 4 |
| Wet strength (passes) | 5 | 7 | 7 | 8 | 8 |
| Abrasion | No | No | No | No | No |
| Felt Tip | | | | | |
| Line dry time (sec) | 4 | 3 | 8 | 5 | 2 |
| Bead dry time (sec) | 7 | 3 | 12 | 6 | 4 |
| Wet strength (passes) | 5 | 8 | 7 | 8 | 8 |
| Pencil abrasion | No | Yes | No | No | No |

As shown in Table 8, the coating performed equally well on each of the substrates. Pencil abrasion was noted on the polypropylene film coating.

Release Coating Example

RC1

Into a 1 liter reaction bottle were charged 100 g of methyl acrylate, 75g of acrylic acid, 30 grams of mercapto-functional siloxane (KF-2001, available from Shin-Etsu Corp.), 0.52 grams VAZO 64 initiator and 307.5 grams methyl ethyl ketone. The resulting mixture was purged with nitrogen at 1 L/min. for 5 minutes after that the bottle was sealed and tumbled in a constant temperature bath at 55° C. for 18 hours. The homogeneous milky viscous solution was diluted with isopropanol to obtain clear 35% solids solution.

To invert the above solvent-borne into waterborne, the following procedure was used. In a 4 liter glass jar were charged 2000 grams DI water, 11 grams ammonium hydroxide (30% conc.) and 100 grams of above solvent-borne polymer solution. The resulting mixture was put on a shaker for 20 minutes and then it was subjected to a vacuum strip at 50° C. to remove methyl ethyl ketone and isopropanol. To the resulting water-borne solution was added 17 grams hexyl carbitol to obtain a coater ready 5% solution in water.

Release Coating Example

RC2

An amber-colored bottle was charged with 102 grams of octadecylacrylate (ODA) (50% solids in ethyl acetate), MA (11 grams), 25 grams of acrylonitrile (AN), AA (13 grams), AIBN (0.5 grams) and 182 grams of ethyl acetate. The resulting mixture was purged with nitrogen for 3 minutes at 1 L/min., after which the bottle was sealed. The sealed bottle containing the solution was tumbled in a constant temperature bath for 48 hours at 65° C.

To obtain a water-borne solution of the above copolymer, 261 grams of DI $H_2O$, 3.1 grams of ammonium hydroxide, and 100 grams of the above-prepared copolymer were homogenized in a suitable container and then the ethyl acetate was stripped offunder vacuum to obtain a 10% solids solution in water.

Release Coating Example (RC3)

A silicone release coating was prepared as follows. Into a 1 L glass bottle was placed 86.1 grams methyl methacrylate, 67.0 grams N-vinyl pyrollidone, 9.6 grams acrylic acid, 57.4 grams of 10,000 molecular weight methacrylate functional silicone macromer, 409 grams methyl ethyl ketone, and 0.55 grams 2,2'-azobis(isobutyronitrile) (AIBN). The reaction bottle was purged with nitrogen, heated, and tumbled in a 55° C. bath for 24 hours. The resulting polymer had a 99.8% conversion. The solution was inverted into water as described below. The polymer had an inherent viscosity (IV) of 0.3 dl/g (0.2 grams in 100 mL THF measured at 23° C.). Some 300 grams of the above solution was diluted and neutralized by adding a solution of 4 grams concentrated ammonia in 900 grams of DI water. The resultant mixture was agitated for 1 hour and aspirated at 40° C. to remove the methyl ethyl ketone. The pH was adjusted to 8.5 by adding 2 grams concentrated ammonia and the solids were adjusted to 5%.

Release Coating Example (RC4)

A silicone release coating was prepared by mixing 10 grams of Syloff 292 (available from Dow Corning), 240 mg of the Syloff anchorage aid, 240 mg of the Syloff fast cure aid, and 350 mg of the Syloff catalyst. The materials were weighed and mixed in a small jar. Within 20 minutes of mixing, the release coating was coated.

Examples 30–33

An intended use of the invention is as a backing for an adhesive coated product in which the adhesive is in contact with the writable coating. For smooth release of the adhesive from the coating, a release coating is required. The substrate in this example was a corona treated polyester film. It was coated with the composition described in Example 2, with an acrylic dispersion, milled crosslinked polyvinyl pyrollidone, and calcium carbonate. Coating was done on a gravure coater using a 55 ruling mill engraved gravure cylinder. The coated film had a dry coating thickness of 10 micrometers. Release coatings were applied using a number 3 wire-wound metering rod. All release coatings were 5% solids as applied. Handspreads were dried at 80° C. for 5 minutes.

TABLE 9

| | Film No. | | | |
|---|---|---|---|---|
| | 30 | 31 | 32 | 33 |
| Release Agent | RC1 | RC2 | RC3 | RC4 |
| Metal Roller | | | | |
| Line dry time (sec) | 2 | 3 | 2 | >60 |
| Bead dry time sec) | 8 | 11 | 11 | >60 |
| Wet strength (passes) | 4 | 6 | 3 | 8 |
| Abrasion | no | no | no | No |
| Felt Tip | | | | |
| Line dry time (sec) | 2 | 2 | 2 | >60 |
| Bead dry time (sec) | 6 | 8 | 13 | >60 |
| Wet strength (passes) | 8 | 5 | 3 | 8 |
| Pencil Abrasion | | Slight | no | No |

TABLE 10

| | | Film No. | | | |
|---|---|---|---|---|---|
| | | 30 | 31 | 32 | 33 |
| Wet out ranking | Ink Solvent | | | | |
| Papermate Metal Roller (fine) | Water | 3 | 3 | 2 | 1 |
| Pentel Rolling Writer (medium) | Water | 3 | 3 | 2 | 1 |
| Expresso Felt Tip (Fine) | Water | 3 | 3 | 3 | 1 |
| Papermate Felt Tip (medium) | Water | 3 | 3 | 3 | 1 |
| Sharpie Felt Tip (fine) | Solvent | 3 | 3 | 3 | 3 |
| Bic Ball-point (medium) | Solvent | 3 | 3 | 3 | 1 |
| Mechanical pencil (fine) | None | 3 | 3 | 3 | 3 |

As show in Table 10, the release coatings on Film No. 30 and 31 had good wet out with all pens. Film 32 had poor wet out with metal roller pens. Film 33 was coated with the silicone release coating and had dewetting of water based inks on the film surface. Release coatings with enough acrylic acid had good wet out with pens and pencils.

Examples 34–42

An important feature of the present invention is the ability of the writable coating to remain firmly adhered to the film during and after heat and humidity aging.

In Examples 34–42, aqueous coating formulations were made according to the procedure in Example 1. In place of the acrylic dispersion polymer described in Example 1, three commercially available acrylic binder resins from BF Goodrich were evaluated: Carboset GA-2136, Carboset 514H, and Carboset 511. The coating formulations contained the acrylic dispersion polymer, milled crosslinked polyvinyl pyrollidone, and calcium carbonate. Ratios of the components in dry weight were 2:2:1. In addition, the aqueous coating formulation contained 0.1% of 3M FC-170C, a nonionic fluorochemical surfactant added as a film wetting agent.

The formulations were handspread on 46 micrometers thick corona treated polyester film using a number 20 wire-wound metering rod. The coated film was dried for 5 minutes at 80° C. in a forced air oven. The thickness of the dry coating was 13 micrometers.

TABLE 11

| | Film No. | | |
|---|---|---|---|
| | 34 | 35 | 36 |
| Binder | GA-2136 | 514H | 511 |
| Metal Roller | | | |
| Line dry time (sec) | 6 | 2 | 2 |
| Bead dry time (sec) | 20 | 5 | 3 |
| Wet strength (passes) | 8 | 7 | 5 |
| Abrasion | Yes | No | Slight |
| Felt Tip | | | |
| Line dry time (sec) | 10 | 3 | 2 |
| Bead dry time (sec) | 10 | 3 | 2 |
| Wet strength (passes) | 8 | 8 | 7 |
| Pencil abrasion | Yes | No | No |

Table 11 shows that all films had dry times of 20 seconds or less, and dry times for the films containing Carboset 514H and Carboset 511 were 7 seconds or less. In addition, the films 35 and 36 had good wet strength and abrasion resistance.

Two release agents were applied to the handspreads on a gravure coater. The two release agents are described in Release Coating Examples RC1 and RC3. Each release agent was coated at 4.5% solids using a 200 pyramidal engraved gravure cylinder. Handspreads were taped to a polyester film carrier web prior to coating of release agents. The entire carrier web was fed through the gravure coating station. The web was dried at 80° C. in a forced air oven, at a web speed was 3 meters per minute.

Following coating of the handspreads with the two release agents, the films were tested for wet out of ink, dry time of ink and wet strength. Films 39–42 had good wet-out with both water-based pens. Films 37 and 38 had poor wet out with water based pens.

TABLE 12

Binders and Release Coatings

| | Film No. | | | | | |
|---|---|---|---|---|---|---|
| | 37 | 38 | 39 | 40 | 41 | 42 |
| Binder | GA-2136 | GA-2136 | 514H | 514H | 511 | 511 |
| Release Agent | RC3 | RC1 | RC3 | RC1 | RC3 | RC1 |
| Metal Roller | | | | | | |
| Wet out rating | 1 | 1 | 3 | 3 | 3 | 3 |
| Line dry time (sec) | 10 | 6 | 2 | 2 | 2 | 2 |
| Bead dry time (sec) | >60 | 40 | 6 | 5 | 4 | 3 |
| Wet strength (passes) | 8 | 8 | 8 | 7 | 6 | 5 |
| Abrasion | Yes | Yes | No | No | Slight | No |
| Felt Tip | | | | | | |
| Wet out rating | 1 | 1 | 3 | 3 | 3 | 3 |
| Line dry time (sec) | 20 | 10 | 3 | 3 | 2 | 2 |
| Bead dry time (sec) | 40 | 35 | 3 | 3 | 3 | 2 |
| Wet strength (passes) | 8 | 8 | 8 | 8 | 8 | 7 |
| Pencil abrasion | Yes | Yes | No | No | No | No |

As shown in Table 12, an important feature of the present invention is the ability of the writable article to contact surfaces at high temperature and humidity without damage to the writable article or the surface. To test for heat and humidity stability of the coating, samples were aged at 38° C./90% RH for one week against paper. Then the samples were conditioned at 23° C. and 50% RH for two days. Table 13 contains the results of humidity aging against surfaces.

TABLE 13

Aging of Binders and Release Coatings

| | Film No. | | | | | |
|---|---|---|---|---|---|---|
| | 37 | 38 | 39 | 40 | 41 | 42 |
| Binder | GA-2136 | GA-2136 | 514H | 514H | 511 | 511 |
| Release Agent | RC3 | RC1 | RC3 | RC1 | RC3 | RC1 |
| Aging at 65° C. Adhesion of Coating to: | | | | | | |
| Polyester Substrate | Good | Good | Good | Good | Good | Good |
| Bond Paper | None | None | None | None | None | None |
| Aging at 38° C. and 90% RH Adhesion to: | | | | | | |
| Polyester Substrate | Good | Good | Good | Good | Good | Good |
| Bond Paper | None | None | None | None | None | None |

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

What is claimed:

1. A writable matte article comprising a water-absorbing layer coated on a substrate, wherein the water absorbing layer is a blend of a crosslinked, water absorbing polymer particle, a water insoluble binder polymer, and optionally, inert organic or inorganic particles that impart a matte finish on at least one major surface of the substrate, wherein the water absorbing polymer particle has a mean volume particle diameter measured in water in the range of 1–25 μm and has a swelling volume between 2–20 mL of water per gram of polymer.

2. The writable matte article according to claim 1 wherein the substrate is selected from the group consisting of polyester-based films, polyolefin-based films, cellulose acetate film, polyvinyl chloride film, paper film laminates, and uncoated paper.

3. The writable matte article according to claim 1 wherein the crosslinked water absorbing polymer particles comprise crosslinked polyvinyl pyrollidone, polyvinyl pyridine, polyacrylic acid, polyacrylamide, polymethacrylamide, polyhydroxyl acrylates, polyamino acrylates, polyethyleneglycol acrylates and mixtures thereof.

4. The writable matte article according to claim 3 wherein the crosslinked water absorbing particle further comprises comonomers that are not water absorbing.

5. The writable matte article according to claim 1 wherein the water insoluble binder polymer comprises acrylate and acrylate/styrene copolymers composed of acrylic acid or methacrylic acid and one or more comonomers, such that the polymers are (a) water insoluble when dry, (b) have an acid number between 30 and 200 mg KOH per gram of resin and (c) a glass transition temperature between 20° C. and 70° C.

6. The writable matte article according to claim 1 wherein the ratio of the crosslinked water absorbing polymer particle to the water insoluble binder polymer is in the range of 0.1 to 1.0.

7. The writable matte article according to claim 1 wherein the binder polymer is selected from the group consisting of colloidal dispersion, emulsion, and solution polymers made in water or solvent.

8. The writable matte article according to claim 6 wherein the binder polymer comprises an acrylic acid or methacrylic acid, that transmits water through the binder polymer to the crosslinked water absorbing particle.

9. The writable matte article according to claim 1 wherein the inert organic or in organic particles are water insoluble.

10. The writable matte article according to claim 9 wherein the inert organic particles are polymethyl methacrylate and natural product polymers in particulate form.

11. The writable matte article according to claim 9 wherein the inorganic particles are calcium carbonate, silica, clay, talc, diatomaceous earth, alumina, zinc oxide, calcium sulfate, and barium sulfate.

12. The writable matte article according to claim 9 wherein the inert organic particles are selected from the group consisting of calcium carbonate, silica, clay, talc, diatomaceous earth, alumina, zinc oxide, calcium sulfate and barium sulfate.

13. The writable matte article according to claim 1 further comprising a release agent coating on the water-absorbing layer.

14. The writable matte article according to claim 13 wherein the release agent is selected from the group consisting of (1) copolymers having at least one vinyl polymeric segment and at least one siloxane polymeric segment; (2) copolymers having an acrylic acid ester of an alkyl terminated alcohol wherein the terminal alkyl chain is from 12 to 24 carbon atoms in length; and (3) copolymers derived from ethylenically-unsaturated fluoroalkyl-containing monomers.

15. The writable matte article according to claim 1 further comprising an adhesive layer on the back surface of the substrate.

16. The writable matte article according to claim 1 wherein the article is inkjet, impact and laser printable.

17. The writable matte article according to claim 1 wherein ball point pen ink, metal roller pen ink, and felt tip pen ink when used to write on the surface of the writable matte article dries in 10 seconds or less.

18. The writtable matte article according to claim 1 wherein pencil writing on the surface of the writable matte article is darker than pencil writing on bond paper.

19. The writable matte article according to claim 1 further comprising a release coating coated on the matte finish surface.

* * * * *